(12) United States Patent
Smits

(10) Patent No.: US 7,640,249 B2
(45) Date of Patent: Dec. 29, 2009

(54) SYSTEM AND METHOD FOR TRANSACTIONAL SESSION MANAGEMENT

(75) Inventor: Thomas Smits, Epfenbach (DE)

(73) Assignee: SAP (AG), Walldorf (DE)

( * ) Notice: Subject to any disclaimer, the term of this patent is extended or adjusted under 35 U.S.C. 154(b) by 270 days.

(21) Appl. No.: 11/393,197

(22) Filed: Mar. 29, 2006

(65) Prior Publication Data

US 2007/0239728 A1   Oct. 11, 2007

(51) Int. Cl.
G06F 7/00 (2006.01)
G06F 17/30 (2006.01)

(52) U.S. Cl. ........................................................ 707/10
(58) Field of Classification Search ........................ None
See application file for complete search history.

(56) References Cited

U.S. PATENT DOCUMENTS

| | | | |
|---|---|---|---|
| 6,052,695 A * | 4/2000 | Abe et al. .................... | 707/202 |
| 6,253,226 B1 * | 6/2001 | Chidambaran et al. ...... | 718/104 |
| 6,490,610 B1 | 12/2002 | Rizvi et al. | |
| 6,496,847 B1 | 12/2002 | Bugnion et al. | |
| 6,931,624 B1 | 8/2005 | Snider | |
| 7,451,434 B1 * | 11/2008 | Blumenthal et al. ......... | 717/116 |
| 2004/0025169 A1 * | 2/2004 | Wiser et al. ................. | 719/315 |
| 2005/0080801 A1 * | 4/2005 | Kothandaraman et al. ... | 707/100 |
| 2005/0144170 A1 * | 6/2005 | Wiser et al. .................... | 707/8 |
| 2006/0106886 A1 * | 5/2006 | McKee et al. ................ | 707/201 |
| 2008/0072240 A1 | 3/2008 | Gschiermeister et al. | |

OTHER PUBLICATIONS

Non-Final Office Action for U.S. Appl. No. 11/391,526, Mailed Feb. 20, 2009, 16 pages.
CCU COMM, "C++ support for Object-Oriented Programming", Advanced Network Technology, Accessed on Apr. 14, 2009, 11 pages.
Microsoft Corporation, "Introduction to Shadow Copies of Shared Folders", Microsoft Corporation, Published: Mar. 2003, Microsoft® Windows Server™ 2003 White Paper, (Mar. 2003), Accessed on Apr. 14, 2009, 18 pages.
Non-Final Office Action for U.S. Appl. No. 11/391,526, Mailed Jul. 9, 2009, 19 pages.

* cited by examiner

*Primary Examiner*—Neveen Abel Jalil
*Assistant Examiner*—Raheem Hoffler
(74) *Attorney, Agent, or Firm*—Blakely, Sokoloff, Taylor & Zafman, LLP

(57) ABSTRACT

A system and method of transactional session management. Information sufficient to permit creation of a deep copy of a session object is saved concurrently for all aspects of the transaction. For example, the saving may save state information provided by different hierarchical levels of the session as well as possible different hardware or software entities participating in the session. In the event of a rollback condition, the deep copy is supplied to one or more applications. Those applications may then continue the session from the point of the deep copy.

20 Claims, 3 Drawing Sheets

SYSTEM AND METHOD FOR TRANSACTIONAL SESSION MANAGEMENT

BACKGROUND OF THE INVENTION

1. Field

Embodiments of the invention relate to session management. More specifically, embodiments of the invention relate to transaction based management of session data.

2. Background

For applications, two major design principles exist: they are either stateful or stateless applications. For "stateless applications," the conversational state can only be found on the front-end (for example, in the browser) and in the persistence layer (normally a database). The middle tier, especially the business logic, does not contain any conversational state. Conversational state is any state that is built up during the conversation (client request processing) with the user and that is kept for longer than one request response cycle. In the discussion before the conversational state of one special user is referred to as "user session" or session. Stateless session beans, as used in Java 2 Enterprise Edition (J2EE), are a good example of a programming model for stateless applications. In "stateful applications," the state is not limited to special layers but is found on all layers of the application. Notably, the business logic may contain state information that is kept for longer than one request cycle.

One major advantage of stateless applications is that they do not consume memory on the server hosting the application logic for the user sessions across requests, reducing the overall memory consumption. On the other hand, stateless applications require that the necessary data is recreated from the persistence layer for each request. With a stateless middle tier, stateless applications can easily handle load balancing and transaction issues. Each request can be dispatched to another application server, because the request, in conjunction with the persistence layer, contains all information necessary to process it. In addition, rollbacks can be done by performing a rollback on the persistence layer.

In general, stateful applications are easier to design and develop. They trade-in memory on the application server for the time needed to create the session data from the persistence and therefore gain performance advantages in some scenarios. One big drawback of stateful applications is that their state is spread on at least two layers (business logic and persistence) and it may become a burden to keep the state synchronized across different stacks and technologies. Transactional behavior of the session is not supported by the existing session concepts and may become difficult in conjunction with stateful applications.

For clarity, the term, "session" as used herein, refers to data representing an interaction between a client and a server. Another common term referring to the same kind of data is "conversational state" because the session comprises the state that was created on the server due to the conversation between client and server. Different session concepts are used in practice with the HttpSession of Java Servlets as one important example. While the Java Servlet concept for sessions is flat, having no hierarchy inside the session data, the web based SAP WebDynpro sessions can have different scopes building a hierarchy of sessions. The session data is normally associated with one particular user accessing the application on the server via the client.

Sessions are commonly implemented using a token that is transported between the client and the server with each request. The token for example may be a hypertext transfer protocol (HTTP) cookie or the username of the user using the client. A token is used as a key for an associative array (for example, java.util.Map) that contains the session data. The data is typically organized as name/value pairs with the name often restricted to a string and the value allowing nearly any kind of object. Applications can store data in the session by adding references to the data to the session object via a session manager. Modifications to the data inside the session are preformed by the application using references to the objects provided by the session manager. Because of the fact that the application can directly manipulate the objects in the session via the provided references, the session manager is not able to keep a log of all performed modifications.

With this background, the difficulty of stateful session management becomes increasingly clear. Because stateful business applications session data can be found on different layers (e.g., business and persistence) and even spread over different systems and all state must be kept synchronized to maintain the applications integrity, a rollback is necessary to bring the application back to the last known consistent state if a failure or other problem occurs. The direct manipulation of the session data performed by the application makes a rollback impossible with existing session management implementations. Using special types of objects for the session data that provide a change log is normally not an option because the application programmer wants to store business objects inside the session and not special crafted, hard to handle data containers.

Performing a rollback on the persistence layer is relatively simple if a relational database system is used. Performing rollbacks on the business object layer is much more difficult. A stateful application, by definition, does not typically persist its complete state to the database after each request—otherwise it would be a stateless application. As a result, deleting the session state from memory and recreating it from the database will always cause a loss of session information; the session is rolled back to the moment of the last database commit. This loss of information can make it difficult or impossible to restart the session in case of a problem.

SUMMARY OF THE INVENTION

A system and method of transactional session management is disclosed. Information sufficient to permit creation of a deep copy of a session object is saved concurrently for all aspects of the transaction. For example, the saving may save state information provided by different hierarchical levels of the session as well as possible different hardware or software entities participating in the session. In the event of a rollback condition, the deep copy is supplied to one or more applications. Those applications may then continue the session from the point of the deep copy.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
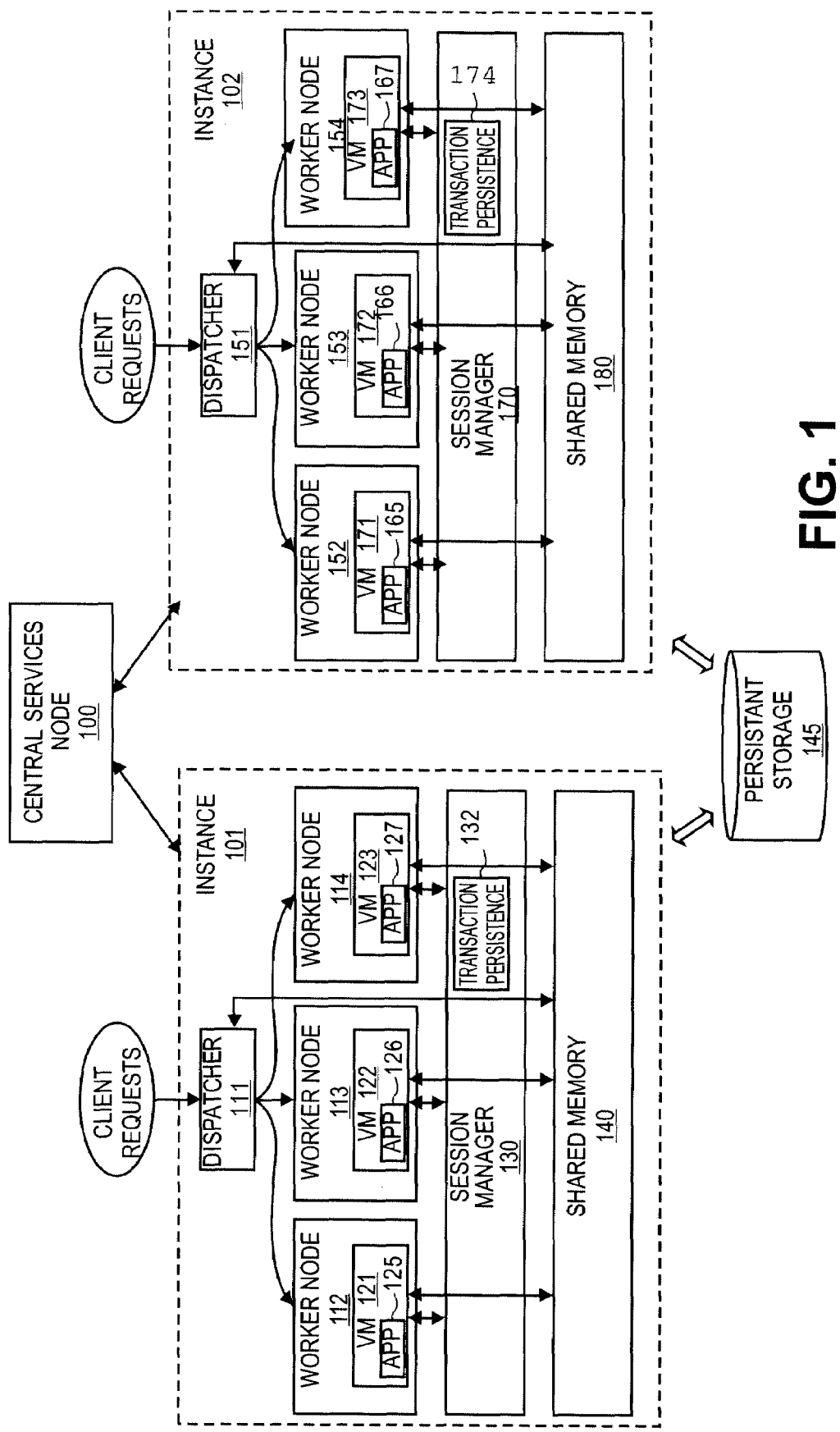
FIG. 1 is a block diagram of a logical view of a system architecture according to one embodiment of the invention.

FIG. 1 is a block diagram of a logical view of a system architecture according to one embodiment of the invention. The architecture may include a plurality of application server instances such as, instances 101 and 102. The application server instance 101 includes a group of worker nodes 112-114, and a dispatcher 111. Typically, instances 101 and 102 in conjunction with central services node 100 form a cluster where a plurality of homogenous interconnected server instances exist, they are referred to as a "cluster." Although the following description focuses primarily on instance 101 for the purpose of explanation, the same principles apply to other instances (e.g. 102) within a cluster.

The worker nodes 112-114 within instance 101 provide the business and/or presentation logic for the network applications supported by the system. In case of a Java based application server, each worker contains a Java virtual machine (represented as virtual machines 121-123, 171-173 in FIG. 1) to execute the business logic and to store the associated data. In case of a non Java based server the architecture may not contain virtual machines. In one embodiment, the dispatcher 111 (151) distributes service requests from clients to one or more of the worker nodes 112-114 (152-154) using request queues stored in shared memory 140 (180). The dispatcher 111 (151) fills the queues with client requests and the worker nodes 112-114 (152-154) consume the requests from each of their respective queues. In another embodiment, requests can be distributed to the worker nodes directly from queues maintained in the dispatcher's memory.

The worker nodes 112-114 (152-154) may be Java 2 Enterprise Edition ("J2EE") worker nodes which support Enterprise Java Bean ("EJB") components of EJB containers (at the business layer) and Servlets and Java Server Pages ("JSP") (at the presentation layer). In one embodiment, the virtual machines 121-125 (171-173) implement the Java 2 Standard Edition Specification 1.3, published Jul. 27, 2001 or subsequent versions thereof (the J2SE Standard). It should be noted, however, that the embodiments of the invention described herein may be implemented in the context of various different software platforms including, by way of example, Microsoft.NET platforms and/or the Advanced Business Application Programming ("ABAP") platforms developed by SAP AG, of Walldorf, Germany.

In one embodiment, session manager 130 (170) manages session objects which reflect the interaction between a client and one or more of applications 125-127 (165-167). The applications register objects with session manager 130 (170). Session manager 130 (170) in turn maintains keys and references to the objects that form part of the session. In any request/response pair between the client and the application, a state change may cause the application to add an object to the session or modify one or more objects within the session. The additions and modifications may be reflected in local memory on a particular worker node and in some cases may exist beyond a request/response to boundary.

As previously noted, if the application persisted these changes to the database 145 on each request, it would be a stateless application. Since it does not, the state information reflecting the changes made during a request response pair may be lost in the event of an application and database rollback. To avoid this, in some embodiments of the invention, session manager 130 (170) includes a transaction persistence module 132 (17), to save information sufficient to create a deep copy of the session object in shared memory 140 (180) responsive to a commit signal from the application. In contrast to a shallow copy, a deep copy will traverse all references that are kept by an object to other objects and performs a deep copy of all referred objects. This results in a recursive process that will copy the transitive closure of all objects that are reachable from the object with which the copy operation originally started. Information sufficient to create a deep copy in various embodiments may include a deep copy created through cloning, a serialization of the session context, or a Shared Closure of the session object. In some embodiments, it is possible for session objects to be distributed across multiple worker nodes (and even in some cases multiple instances) when any application (e.g., 125) signals a commit, the transaction persistence module 132 forces any other participants, e.g., application 126 to also commit any changes to the session object. In this manner, coherency across the session can be maintained.

In an alternative embodiment transactions persistence module 132 may automatically save information sufficient to create a deep copy, "deep copy" for short, on any request/response pair boundary. In one embodiment, the deep copy is stored in a particular location in shared memory 140, e.g., as a Shared Closure of the session object and replaced with a subsequent deep copy on the next occurrence of a commit signal. In some embodiments, a counter may be maintained and the deep copy may be persisted to the persistent storage 145, such as a database or file system when the counter reaches a particular count, e.g., after every tenth commit the deep copy is persisted to persistent storage 145.

Figure 2:
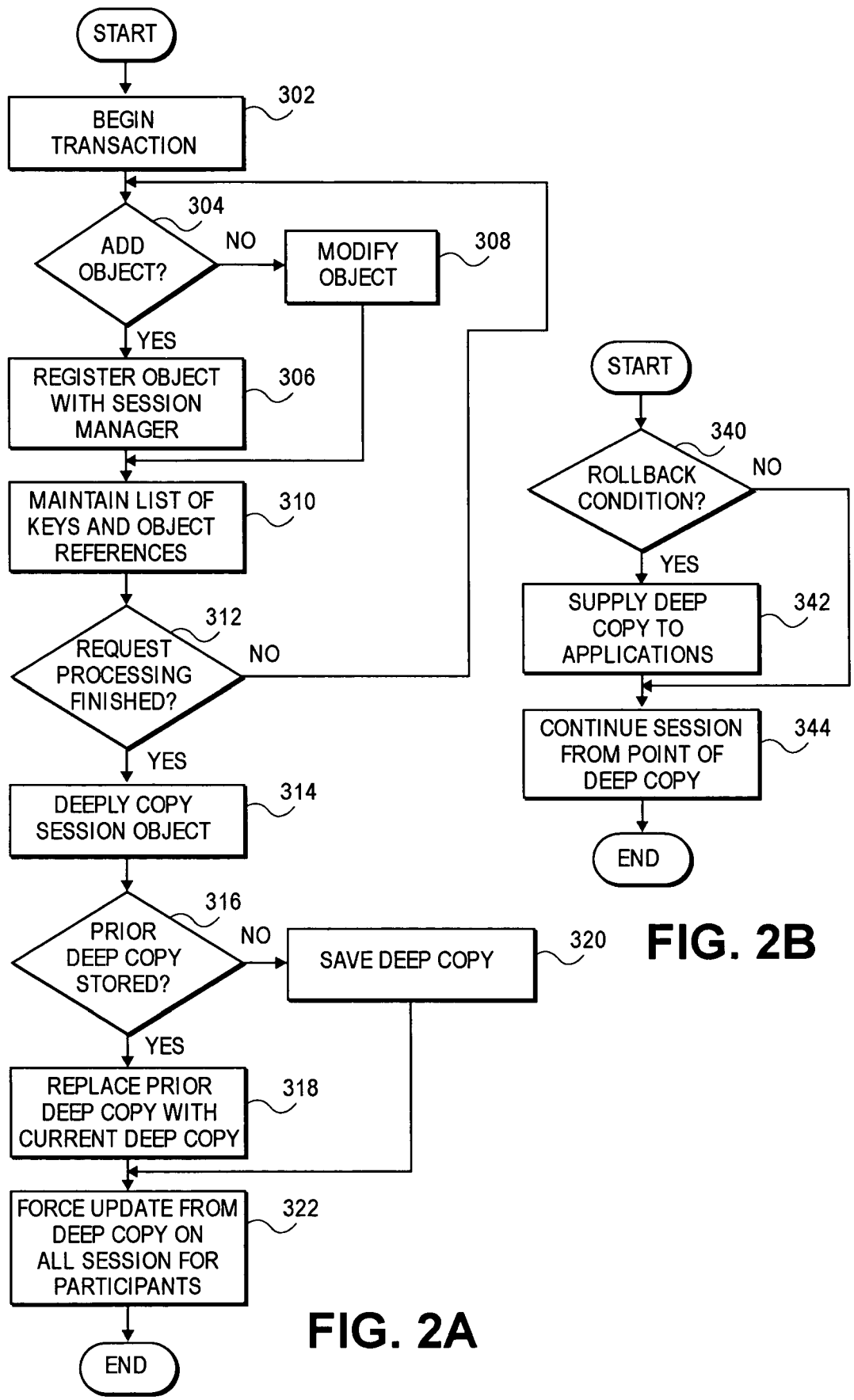
FIG. 2A is a flow diagram of operation in one embodiment of the invention.
FIG. 2B is a flow diagram of operation of one embodiment of the invention response to a rollback condition.

FIG. 2A is a flow diagram of operation in one embodiment of the invention. At block 302 the transaction begins. A determination is made at block 304 whether an object is to be added to the session. If not, one or more objects in the session may be modified at block 308. At block 306, if an object was added at block 304, the object is registered with the session manager. At block 310, session manager maintains a list of keys and object references which identify the objects as part of the session and where they may be found. A determination is made at block 312. Whether the request processing is finished. If the client request processing is finished, session manager deeply copies the session object at block 314. To deeply copy the session object requires copying of all objects referenced by the objects directly registered with the session management. The deep copy guarantees that all objects that are reachable from the session objects are copied and no references to objects outside exists (because if they existed, they would be copied also). The copied data represents a private resource of the session manager, e.g., neither the application nor any other code except the session manager can access that data. Therefore the session manager can be sure that no other component can tamper with the copied data during operations performed by the session manager on that data. This allows the session manager to update older copies of the session with new copies atomically.

In one embodiment, the deep copy may be performed using cloning. In Java, using cloning for deep copy operations is only possible if all objects stored directly or indirectly overwrite clone( ) correctly. In this context, "indirectly" means, reachable from the objects stored in the session by following all references between objects. This requires that the application programmer provide for deep cloning as opposed to shallow cloning where referenced objects would not be cloned. Deep cloning cannot be enforced purely from the session manager. In another embodiment, a deep copying can be performed using serialization. In such a Java embodiment, all classes must allow serialization by implementing the java.io.Serializable interface. If serialization succeeds a deep copy has necessarily been created. In another embodiment, Shared Closures may be used to create the deep copy. Shared Closures are a sharing technology that is semantically identical to Java serialization. The technology was invented and implemented by SAP AG of Walldorf, Germany. A Shared Closure is a copy of the transitive closure of all objects and does not permit references from the closure to objects outside. Creating a Shared Closure necessarily provides a deep copy.

At decision block 316, a determination is made if a prior deep copy is stored. If a prior deep copy is stored, the prior deep copy is replaced with a current deep copy at block 318. If no prior deep copy is stored, a deep copy is saved in, for example, shared memory at block 320. At block 322, all participants are forced to update their local storage based on the deep copy. This insures coherency of the session in different participants as described more fully below with reference to FIG. 3.

FIG. 2B is a flow diagram of operation of one embodiment of the invention response to a rollback condition. At block 340, a determination is made at rollback condition has occurred. Rollback may be caused by a problem, such as the application not receiving expected data from an external system for example. In such case, the application may signal a rollback. Also, the session manager may signal the rollback when certain events occur that may precipitate erroneous handling of the transaction. In such case, session manager supplies the last deep copy to the applications or other participants in the session at block 342. The application may then continue the session at the point where the last deep copy was saved at block 344.

Figure 3:
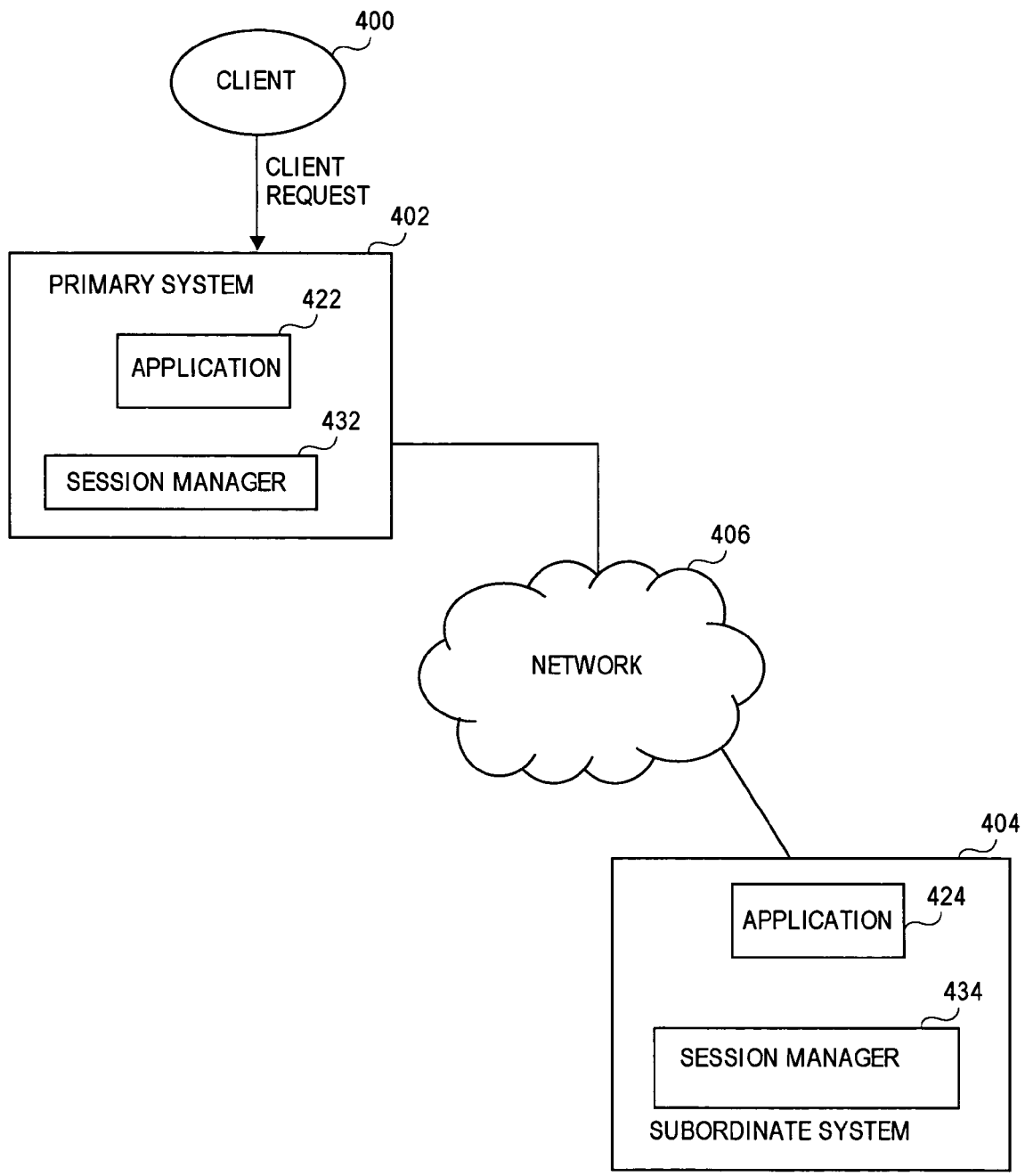
FIG. 3 is a block diagram of a transactional session management in a distributed system.

FIG. 3 is a block diagram of a transactional session management in a distributed system. The transactional session management is able to span distributed systems. The mechanism is explained herein using the example of two systems (Primary System 402 and Subordinate System 406) connected via a network 406, exchanging messages (requests/responses) with each other and both running stateful applications 422, 424. In various embodiments, network 406 may be a local area network (LAN) or, for example, the Internet. It is assumed that the two systems 402, 404 contain session managers 432, 434 that are able to deal with transactional sessions and that are interoperable in the sense that the session managers 432, 434 can interchange messages with each other. For the ease of the explanation it is also assumed that the requests/responses between the systems are performed in a synchronous manner. However, in some embodiments, these communications may be conducted asynchronously. A client 450 is connected to the primary system 402. Subordinate system 404 is called by primary system 402, to provide some services to primary system 402. For example, application 424 may provide a fast calculation service to application 422 this does e.g., purchase order processing. This is only one example of a possible distinctive session many other possible examples exist.

Serving the client request, objects in the session are modified in primary system 402. Now the application logic in primary system 402 triggers a call to subordinate system 404. Again in subordinate system 406, some objects are created or modified because of this request. After subordinate system 404 has finished processing the request, a deep copy of the session data is created but the old version of that copy is not replaced initially. The information that subordinate system 404 is running in a transaction managed by primary system 402 needs to be transported either in the request from primary system 402 to subordinate system 404 or by some other means. This information is important, because subordinate system 404 should behave differently if called by a primary system 402 instead of being called by a client. The difference is that commits initiated by the application 424 or the session manager 434 running on the subordinate system 404 should be ignored in case of a subordinate system. So subordinate system 404 now contains two deep copies of the session, one created in the former request ("old") and one created in the current one ("new").

Subordinate system 404 returns control to primary system 402 and primary system 402 may do some additional processing. Shortly before the response is sent to the client, the session manager 432 in primary system 402 wants to commit the session data (auto-commit) or the application in primary system 402 explicitly asks for a commit (manual-commit). Now the session manager 432 in primary system 402 does the same subordinate system 404 has done before and creates a deep copy of the session data resulting in an "old" and a "new" copy of the session. Before actually replacing the old with the new copy, the session manager 432 in primary system 402 sends a message to the session manager 434 in subordinate system 404 and asks subordinate system 404 to replace its old copy with the new one. After the subordinate system 404 confirms that replacement was successful, the primary system 402 also replaces the old with the new copy and returns the response to the client. Because the subordinate system 404 has already created the copy the replacement operation is not likely to fail, it is only a reference to the copy to be updated and the old version to be deleted. Nevertheless in case of a problem, the primary system 402 should discard the new copy and signal a rollback to the application.

In one embodiment, rollbacks are handled in a similar manner with the difference that only the primary system 402 can initiate commits, but both the primary system 402 and the subordinate system 404 are allowed to signal a rollback. A rollback can be triggered by the application 422 running on the primary system 402, the application 424 running on the subordinate system 404, the session manager 432 or the session manager 434. In all cases, the information that a rollback should performed needs to be sent from the initiating system to the other one. For example, if the application running on the subordinate system 404 encounters a problem, it may initiate a rollback. This information is given to the session manager 434 and transported to the primary system 402 via the response, the subordinate system 404 would send to the primary system 402 anyway. If one system performs a rollback, all other systems should do the same. Therefore the rollback initiated by the application 424 will also trigger a rollback for the primary system 402. Technically the rollback is easy to implement because the session managers 432, 434 only have to discard the new copies of the session data and continue with the old copies. While in this example, the session is distributed between only two systems, it should be understood that the number of subordinate systems may be arbitrarily large. Moreover, in some embodiments, those may be systems that are subordinate to a subordinate system. In such case, the less subordinate system is assumed to be the primary system for purposes of the interaction between those two systems.

Elements of embodiments may also be provided as a computer readable storage medium for storing the computer readable instructions. The computer readable storage medium may include, but is not limited to, flash, memory, optical disks, CD-ROMs, DVD ROMs, RAMS, EPROMs, EEPROMs, magnetic or optical cards, or other type of computer readable storage media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method associated with a computer comprising:
    signaling a commit of one or more stateful applications associated with a session object, wherein the one or more stateful applications having states spread on at least a business logic layer and a persistence layer;
    saving information, associated with the one or more stateful applications in response to the commit signal, by a transaction persistence module of a session manager, the session manager to maintain keys and references to the session object;
    determining existence of a deep copy of the session object;
    creating, in response to the determining, a new deep copy of the session object concurrently for all aspects of a transaction;
    updating the deep copy of the session object in response to the determining, wherein the created new deep copy and the updated deep copy of the session object include data of all objects that are directly or indirectly referenced by the session object;
    supplying the deep copy to the one or more stateful applications responsive to a rollback condition; and
    continuing a session corresponding to the session object from a point at which the deep copy was most recently saved or updated or from a point at which the new deep copy was created.

2. The method of claim 1, and wherein the session corresponding to the session object represents an interaction between a client and a server.

3. The method of claim 1 wherein saving comprises one of:
    deeply cloning the session object comprising copying a root object and all related objects,
    serializing the session object, and
    creating a Shared Closure of the session.

4. The method of claim 1, wherein the rollback condition includes a condition where the one or more stateful applications are not receiving expected data from an external system.

5. The method of claim 1, wherein saving comprises: forcing a save on other members of a distributed system responsive to the saving on any single member of the distributed system.

6. The method of claim 1, further comprising: receiving a registration of the session object from the one or more stateful applications.

7. The method of claim 1, wherein the saving occurs automatically on every request/response pair boundary.

8. A computer readable storage medium containing computer executable instructions that, when executed, cause a computer to perform a method, the method comprising:
    signaling a commit of one or more stateful applications associated with a session object, wherein the one or more stateful applications having states spread an at least a business logic laver and a persistence layer;
    saving information, associated with the one nr more stateful applications in response to the commit signal, the session manager to maintain keys and references to the session object;
    determining existence of a deep copy of the session object;
    creating, in response to the determining, a new deep copy of the session object concurrently for dl aspects of a transaction;
    updating the deep copy of the session object in response to the determining, wherein the created new deep copy and the updated deep copy of the session object include data of all objects that are directly or indirectly referenced by the session object;
    supplying the deep copy to the one or more stateful applications responsive to a rollback condition, and
    continuing a session corresponding to the session object from a point at which the deep copy was most recently saved w updated or from a point at which the new deep copy was created.

9. The computer readable storage medium of claim 8, wherein the one or more stateful applications having states spread on at least a business logic layer and a persistence layer, and wherein the session corresponding to the session object represents an interaction between a client and a server.

10. The computer readable storage medium of claim 8, further comprising instructions that, when executed, cause the computer to further perform a method comprising one of
    deeply cloning the session object comprising copying a root object and all related objects,
    serializing the session object, and
    creating a Shared Closure of the session.

11. The computer readable storage medium of claim 8, wherein the rollback condition includes a condition where the one or more stateful applications are not receiving expected data from an external system.

12. The computer readable storage medium of claim 8 to perform the method of saving, further comprising instructions that, when executed, cause the computer to further perform the method comprising:
    forcing a save on other members of a distributed system responsive to the saving on any single member of the distributed system.

13. A system comprising:
    a first server including a fist stateful application to handle client requests, the first stateful application having states spread on at least a business logic layer and a persistence layer of the first server;
    a first session manager of the first server to maintain a session object associated with the first stateful application, the session manager including a transactional persistence module to save information to create a deep copy of the first session object responsive to an event, the deep copy of the session object includes data of all objects that are directly or indirectly referenced by the session object, and the first session manager to maintain keys and references to the session object; and a second server coupled across a network with the first server, the second server including a second stateful application to provide support to the first stateful application and a second session manager, the second stateful application having states spread on at least a business logic layer and a persistence layer of the second server, wherein the first session manager coordinates with the second session manager to assure coherent session management on the first server and the second server.

14. The system of claim 13 further comprising:

a shared memory in which the information is persistently saved responsive to the event.

15. The system of claim 14 further comprising:

a database to which the information may be periodically copied from the shared memory.

16. The system of claim 13, wherein the event is one of a commit signal initiated only by the first stateful application of the first server, and a rollback signal initiated by either the first stateful application or the second stateful application.

17. The system of claim 13 wherein the transactional persistence module is to replace a previous deep copy of the session object with a current deep copy of the session object responsive to the event.

18. An apparatus comprising:

means for deeply copying a session object associated with a stateful application in response to an event, the stateful application having states spread on at least a business logic layer and a persistence layer, and the deeply copying of the session object includes a copy of data of all objects that ate directly or indirectly referenced by the session object; and means for propagating the deep copy, the deep copy generated by the means for deeply copying, in a distributed system a subordinate machine to a primary machine if a rollback condition occurs, wherein the rollback condition includes a condition where the stateful application is not receiving expected data from an external system.

19. The apparatus of claim 18, further comprising:

means for storing the deep copy.

20. The apparatus of claim 18, further comprising:

means for forcing a commit or rollback on all session participants in response to commit or rollback by one session participant.

* * * * *

UNITED STATES PATENT AND TRADEMARK OFFICE
CERTIFICATE OF CORRECTION

PATENT NO. : 7,640,249 B2  Page 1 of 1
APPLICATION NO. : 11/393197
DATED : December 29, 2009
INVENTOR(S) : Thomas Smits It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this

Twenty-first Day of December, 2010

David J. Kappos
*Director of the United States Patent and Trademark Office*